US010169290B2

(12) United States Patent
Liu et al.

(10) Patent No.: US 10,169,290 B2
(45) Date of Patent: Jan. 1, 2019

(54) DATA PROCESSING METHOD AND APPARATUS

(71) Applicant: Huawei Technologies Co., Ltd., Shenzhen (CN)

(72) Inventors: Yijun Liu, Shenzhen (CN); Guangjian Tian, Hong Kong (HK); Yong Cao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 315 days.

(21) Appl. No.: 15/013,698

(22) Filed: Feb. 2, 2016

(65) Prior Publication Data

US 2016/0224704 A1 Aug. 4, 2016

(30) Foreign Application Priority Data

Feb. 3, 2015 (CN) .......................... 2015 1 0054583
Jan. 8, 2016 (CN) .......................... 2016 1 0013810

(51) Int. Cl.
| | |
|---|---|
| *G06F 17/50* | (2006.01) |
| *G06F 17/10* | (2006.01) |
| *G06Q 10/04* | (2012.01) |

(52) U.S. Cl.
CPC ............. *G06F 17/10* (2013.01); *G06Q 10/04* (2013.01)

(58) Field of Classification Search
USPC .......................... 703/2, 6; 705/50, 7.11, 7.23
See application file for complete search history.

(56) References Cited

U.S. PATENT DOCUMENTS 8,468,244 B2 * 6/2013 Redlich .................. G06Q 10/06
705/50
9,323,599 B1 * 4/2016 Iyer ...................... G06F 11/0751
(Continued)

FOREIGN PATENT DOCUMENTS

| CN | 101159968 A | 4/2008 |
| CN | 102930177 A | 2/2013 |
| CN | 103095937 A | 5/2013 |
| CN | 103987056 A | 8/2014 |

(Continued)

OTHER PUBLICATIONS

Cormode et al., "An Improved Data Stream Summary: The Count-Min Sketch and its Applications," Journal of Algorithms, vol. 55, Issue 1, Elsevier, Philadelphia, Pennsylvania (Apr. 2005).

(Continued)

*Primary Examiner* — Thai Phan
(74) *Attorney, Agent, or Firm* — Leydig, Voit & Mayer, Ltd.

(57) ABSTRACT

The present invention provides a data processing method, including: acquiring historical data, where the historical data belongs to a first level and a second level, and data corresponding to the first level comprises data corresponding to the second level; generating, from the historical data, a first-granularity data set according to a first granularity, and generating, from the historical data, a second-granularity data set according to a second granularity, where the first granularity and the second granularity respectively correspond to the first level and the second level; performing modeling for a second-granularity forecasting model according to the first-granularity data set and the second-granularity data set; and performing forecasting by using the second-granularity forecasting model to obtain second-granularity forecast data. The present invention enables obtained forecast data of different granularities to be consistent.

20 Claims, 5 Drawing Sheets

(56) References Cited

U.S. PATENT DOCUMENTS

| | | | | |
|---|---|---|---|---|
| 9,734,473 | B2* | 8/2017 | Scott | G06Q 10/0631 |
| 2006/0026642 | A1 | 2/2006 | Schaffer et al. | |
| 2008/0221949 | A1* | 9/2008 | Delurgio | G06Q 10/04 |
| | | | | 705/7.11 |
| 2009/0327049 | A1 | 12/2009 | Kisin et al. | |
| 2014/0288991 | A1* | 9/2014 | Strong | G06Q 10/06313 |
| | | | | 705/7.23 |

FOREIGN PATENT DOCUMENTS

| | | |
|---|---|---|
| CN | 104462793 A | 3/2015 |
| CN | 104766144 A | 7/2015 |

OTHER PUBLICATIONS

Metwally et al., "An Integrated Efficient Solution for Computing Frequent and Top-k Elements in Data Streams," ACM Transactions on Database Systems, vol. 31, No. 3, pp. 1095-1133, Association for Computing Machinery, New York, New York (Sep. 2006).

Pavan et al., "Counting and Sampling Triangles from a Graph Stream," Proceedings of the VLDB Endowment, vol. 6, No. 14, Trento, Italy, pp. 1870-1881, Very Large Databases Endowment Inc. (Aug. 26-30, 2013).

Latapy, "Main-memory Triangle Computations for Very Large (Sparse (Power-Law)) Graphs," Theoretical Computer Science, vol. 407, Issue 1, Elsevier, Philadelphia, Pennsylvania (Nov. 2008).

Hu et al., "Massive Graph Triangulation," Proceedings of the 2013 ACM SIGMOD International Conference on Management of Cata, New York, New York, Association for Computing Machinery, New York, New York (Jun. 22-27, 2013).

* cited by examiner

US 10,169,290 B2

DATA PROCESSING METHOD AND APPARATUS

CROSS-REFERENCE TO RELATED APPLICATIONS

This application claims priority to Chinese Patent Application No. 201610013810.X, filed on Jan. 8, 2016, and Chinese Patent Application No. 201510054583.0, filed on Feb. 3, 2015, both of which are hereby incorporated by reference in their entireties.

TECHNICAL FIELD

The present invention relates to computer technologies, and in particular, to a data processing method and apparatus.

BACKGROUND

Nowadays, with a rapid growth of communications services, information transmission is inseparable from a secure and stable transmission network with a large capacity. A precise and efficient outsourcing service management system can help a telecommunications operator implement efficient management and proper assignment of outsourcing tasks and personnel, where similar work such as construction, repairmen, and maintenance that are of a mobile communications site all belong to a scope of outsourcing services. In addition, a precise forecast of a user behavior of a communications service user also provides necessary data reference and basis for developing a marketing strategy by the operator.

An existing outsourcing service planning system is used as an example, where the outsourcing service planning system may be divided into two parts: outsourcing service requirement forecasting and outsourcing service planning. The outsourcing service requirement forecasting specifically includes: performing forecasting modeling on data sets that require forecasting and planning to obtain a forecasting model, and forecasting, by using the forecasting model according to existing historical data, data values of one or more future periods that have a time period same as that of the historical data. The outsourcing service planning includes: obtaining target result data by means of calculation according to the data values obtained by forecasting and a planning model, where the target result is an ultimate result output by the outsourcing service planning system.

When one department manages multiple regions and one region involves multiple projects, a region-dimension outsourcing service plan may be obtained in two manners: one is performing forecasting and planning directly in a region dimension to obtain a regional outsourcing service plan; the other is performing forecasting and planning in a project dimension to obtain outsourcing service plans of all projects in a region, and then aggregating the outsourcing service plans of all the projects in the region to obtain a regional outsourcing service plan.

However, the regional outsourcing service plans obtained in the foregoing two manners are inconsistent; as a result, which result should prevail cannot be determined during decision making, and corresponding decision making processing cannot be performed accurately in time.

SUMMARY

The present invention provides a data processing method and apparatus, which enable obtained forecast data of different granularities to be consistent.

According to a first aspect, a data processing method is provided, including:

acquiring historical data, where the historical data belongs to a first level and a second level, and data corresponding to the first level includes data corresponding to the second level;

generating, from the historical data, a first-granularity data set according to a first granularity, and generating, from the historical data, a second-granularity data set according to a second granularity, where the first granularity and the second granularity respectively correspond to the first level and the second level;

performing modeling for a second-granularity forecasting model according to the first-granularity data set and the second-granularity data set; and performing forecasting by using the second-granularity forecasting model to obtain second-granularity forecast data.

With reference to the first aspect, in a first implementation manner of the first aspect, the first level and the second level respectively include: a first space level and a second space level, a first time level and a second time level, a first organization level and a second organization level, or a first quantity level and a second quantity level, where the first time level and the second time level refer to two levels that have different time lengths and to which the data belonging to the first level and the data belonging to the second level respectively belong; the first space level and the second space level refer to two levels that have different space sizes and to which the data belonging to the first level and the data belonging to the second level respectively belong; the first organization level and the second organization level refer to two levels that have different organization level ranks and to which the data belonging to the first level and the data belonging to the second level respectively belong; the first quantity level and the second quantity level refer to two levels that have different user quantities and to which the data belonging to the first level and the data belonging to the second level respectively belong; where in a level comparison relationship, the first level is higher than the second level, that is, the first-granularity data set corresponding to the first level is larger than and includes the second-granularity data set corresponding to the second level.

With reference to the first aspect, in the second implementation manner of the first aspect, the completing modeling for a second-granularity forecasting model by using the first-granularity data set and the second-granularity data set includes:

acquiring a maximum-likelihood estimation MLE model of the second-granularity data set;

acquiring a penalty coefficient product correction term of an accumulative sum of the first-granularity data set;

performing correction on the MLE model of the second-granularity data set by using the penalty coefficient product correction term of the accumulative sum of the first-granularity data set; and completing the modeling for the second-granularity forecasting model by using a corrected MLE model of the second-granularity data set.

With reference to the first aspect or the first implementation manner of the first aspect, in a second implementation manner of the first aspect, the method further includes:

acquiring a smooth parameter according to the first-granularity data set; and performing smooth correction on the second-granularity forecast data by using the smooth parameter.

With reference to the second implementation manner of the first aspect, in a third implementation manner of the first aspect, the acquiring a smooth parameter according to the first-granularity data set includes:

performing modeling for a first-granularity forecasting model according to the first-granularity data set;

acquiring at least two first-granularity data subsets of the first-granularity data set, where amounts of first-granularity data respectively included in the at least two first-granularity data subsets increase in sequence, and a data subset with a larger amount of data includes all data included in a data subset with a smaller amount of data;

performing forecasting by using the first-granularity forecasting model to obtain at least two pieces of first-granularity forecast data, where the at least two pieces of first-granularity forecast data correspond to the first-granularity data subsets one to one;

obtaining at least two substep smooth parameters according to the at least two pieces of first-granularity forecast data, where the substep smooth parameters correspond to the at least two pieces of first-granularity forecast data one to one; and obtaining the smooth parameter according to the at least two substep smooth parameters.

With reference to the third implementation manner of the first aspect, in a fourth implementation manner of the first aspect, the at least two first-granularity data subsets include a first-granularity data subset A, and the first-granularity data subset A corresponds to first-granularity forecast data A; and the obtaining at least two substep smooth parameters according to the at least two pieces of first-granularity forecast data includes:

aggregating the first-granularity forecast data A into second-granularity data A;

acquiring, from the second-granularity data set, second-granularity data B corresponding to the second-granularity data A; and obtaining, according to the second-granularity data A and the second-granularity data B, the sub step smooth parameter corresponding to the first-granularity forecast data A.

With reference to the fourth implementation manner of the first aspect, in a fifth implementation manner of the first aspect, the substep smooth parameter corresponding to the first-granularity forecast data A is obtained by means of calculation by using the following formula:

$$\lambda = \frac{S_{realB}}{S_{forecastA}} - 1;$$

where $\lambda$ is the substep smooth parameter corresponding to the first-granularity forecast data A, $S_{realB}$ is the second-granularity data B, and $S_{forecastA}$ is the second-granularity data A.

With reference to the first aspect and any of the first to the fifth implementation manners of the first aspect, in a sixth implementation manner of the first aspect, the method further includes:

generating, from the historical data, a third-granularity data set according to a third granularity, where the third granularity is coarser than the second granularity;

acquiring a feedback correction parameter according to the third-granularity data set; and performing feedback correction on the second-granularity forecast data by using the feedback correction parameter.

With reference to the sixth implementation manner of the first aspect, in a seventh implementation manner of the first aspect, the acquiring a feedback correction parameter according to the third-granularity data set includes:

acquiring at least two second-granularity data subsets of the second-granularity data set;

performing forecasting by using the second-granularity forecasting model to obtain at least two pieces of second-granularity forecast data, where the at least two pieces of second-granularity forecast data correspond to the second-granularity data subsets one to one;

obtaining at least two substep feedback correction parameters according to the at least two pieces of second-granularity forecast data and the third-granularity data set, where the substep feedback correction parameters correspond to the at least two pieces of second-granularity forecast data one to one; and obtaining the feedback correction parameter according to the at least two substep feedback correction parameters.

With reference to the seventh implementation manner of the first aspect, in an eighth implementation manner of the first aspect, the at least two second-granularity data subsets include a second-granularity data subset C, and the second-granularity data subset C corresponds to second-granularity forecast data C; and the obtaining at least two substep feedback correction parameters according to the at least two pieces of second-granularity forecast data and the third-granularity data set includes:

aggregating the second-granularity forecast data C into third-granularity data C;

acquiring, from the third-granularity data set, third-granularity data D corresponding to the third-granularity data C; and obtaining, according to the third-granularity data C and the third-granularity data D, a substep feedback correction parameter corresponding to the second-granularity forecast data C.

With reference to the eighth implementation manner of the first aspect, in a ninth implementation manner of the first aspect, the substep feedback correction parameter corresponding to the second-granularity forecast data C is obtained by means of calculation by using the following formula:

$$\lambda = \frac{S_{realD}}{S_{forecastC}} - 1;$$

where $\lambda$ is the substep feedback correction parameter corresponding to the second-granularity forecast data C, $S_{realD}$ is the third-granularity data D, and $S_{forecastC}$ is the third-granularity data C.

According to a second aspect, a data processing method is provided and includes:

acquiring historical data;

generating, from the historical data, a first-granularity data set according to a first granularity, and generating, from the historical data, a second-granularity data set according to a second granularity, where data set coarse-and-fine granularities of the first-granularity data set and the second-granularity data set are different, that the coarse-and-fine granularities of the data sets are different means that levels of data sources are different, and that the levels of data sources are different means that time lengths of data sources are different, space sizes of data sources are different, organization level ranks of data sources are different, and user quantities of data sources are different; where in a coarse-and-fine granularity comparison relationship, a data set coarse-and-fine granularity of the first-granularity data set is coarser than that of the second-granularity data set, that is, the first-granularity data set is larger than and includes the second-granularity data set;

performing modeling for a second-granularity forecasting model according to the second-granularity data set;

performing forecasting by using the second-granularity forecasting model to obtain second-granularity forecast data;

acquiring a smooth parameter according to the first-granularity data set; and performing smooth correction on the second-granularity forecast data by using the smooth parameter.

With reference to the second aspect, in a first implementation manner of the second aspect, the acquiring a smooth parameter according to the first-granularity data set includes:

performing modeling for a first-granularity forecasting model according to the first-granularity data set;

acquiring at least two first-granularity data subsets of the first-granularity data set, where amounts of first-granularity data respectively included in the at least two first-granularity data subsets increase in sequence, and a data subset with a larger amount of data includes all data included in a data subset with a smaller amount of data;

performing forecasting by using the first-granularity forecasting model to obtain at least two pieces of first-granularity forecast data, where the at least two pieces of first-granularity forecast data correspond to the first-granularity data subsets one to one;

obtaining at least two substep smooth parameters according to the at least two pieces of first-granularity forecast data, where the substep smooth parameters correspond to the at least two pieces of first-granularity forecast data one to one; and obtaining the smooth parameter according to the at least two substep smooth parameters.

With reference to the first implementation manner of the second aspect, in a second implementation manner of the second aspect, the at least two first-granularity data subsets include a first-granularity data subset A, and the first-granularity data subset A corresponds to first-granularity forecast data A; and the obtaining at least two substep smooth parameters according to the at least two pieces of first-granularity forecast data includes:

aggregating the first-granularity forecast data A into second-granularity data A;

acquiring, from the second-granularity data set, second-granularity data B corresponding to the second-granularity data A; and obtaining, according to the second-granularity data A and the second-granularity data B, the sub step smooth parameter corresponding to the first-granularity forecast data A.

With reference to the second implementation manner of the second aspect, in a third implementation manner of the second aspect, the substep smooth parameter corresponding to the first-granularity forecast data A is obtained by means of calculation by using the following formula:

$$\lambda = \frac{S_{realB}}{S_{forecastA}} - 1;$$

where $\lambda$ is the substep smooth parameter corresponding to the first-granularity forecast data A, $S_{realB}$ is the second-granularity data B, and $S_{forecastA}$ is the second-granularity data A.

With reference to the second aspect and any of the first to the third implementation manners of the second aspect, in a fourth implementation manner of the second aspect, the method further includes:

generating, from the historical data, a third-granularity data set according to a third granularity, where the third granularity is coarser than the second granularity;

acquiring a feedback correction parameter according to the third-granularity data set; and performing feedback correction on the second-granularity forecast data by using the feedback correction parameter.

With reference to the fourth implementation manner of the second aspect, in a fifth implementation manner of the second aspect, the acquiring a feedback correction parameter according to the third-granularity data set includes:

acquiring at least two second-granularity data subsets of the second-granularity data set;

performing forecasting by using the second-granularity forecasting model to obtain at least two pieces of second-granularity forecast data, where the at least two pieces of second-granularity forecast data correspond to the second-granularity data subsets one to one;

obtaining at least two substep feedback correction parameters according to the at least two pieces of second-granularity forecast data and the third-granularity data set, where the substep feedback correction parameters correspond to the at least two pieces of second-granularity forecast data one to one; and obtaining the feedback correction parameter according to the at least two substep feedback correction parameters.

With reference to the fifth implementation manner of the second aspect, in a sixth implementation manner of the second aspect, the at least two second-granularity data subsets include a second-granularity data subset C, and the second-granularity data subset C corresponds to second-granularity forecast data C; and the obtaining at least two substep feedback correction parameters according to the at least two pieces of second-granularity forecast data and the third-granularity data set includes:

aggregating the second-granularity forecast data C into third-granularity data C;

acquiring, from the third-granularity data set, third-granularity data D corresponding to the third-granularity data C; and obtaining, according to the second-granularity data C and the third-granularity data D, a substep feedback correction parameter corresponding to the second-granularity forecast data C.

With reference to the sixth implementation manner of the second aspect, in a seventh implementation manner of the second aspect, the substep feedback correction parameter corresponding to the second-granularity forecast data C is obtained by means of calculation by using the following formula:

$$\lambda = \frac{S_{realD}}{S_{forecastC}} - 1;$$

where

λ is the substep feedback correction parameter corresponding to the second-granularity forecast data C, $S_{realD}$ is the third-granularity data D, and $S_{forecastC}$ is the third-granularity data C.

With reference to the second aspect and any of the first to the seventh implementation manners of the second aspect, in an eighth implementation manner of the second aspect, the modeling for the second-granularity forecasting model is performed only by using the second-granularity data set; or the modeling for the second-granularity forecasting model is performed by using the first-granularity data set and the second-granularity data set.

According to a third aspect, a data processing method is provided and includes:

acquiring historical data;

generating, from the historical data, a first-granularity data set according to a first granularity, and generating, from the historical data, a second-granularity data set according to a second granularity, where data set coarse-and-fine granularities of the first-granularity data set and the second-granularity data set are different, that the coarse-and-fine granularities of the data sets are different means that levels of data sources are different, and that the levels of data sources are different means that time lengths of data sources are different, space sizes of data sources are different, organization level ranks of data sources are different, and user quantities of data sources are different; where in a coarse-and-fine granularity comparison relationship, a data set coarse-and-fine granularity of the first-granularity data set is coarser than that of the second-granularity data set, that is, the first-granularity data set is larger than and includes the second-granularity data set;

performing modeling for a first-granularity forecasting model according to the first-granularity data set;

performing forecasting by using the first-granularity forecasting model to obtain first-granularity forecast data;

acquiring a feedback correction parameter according to the second-granularity data set; and performing feedback correction on the first-granularity forecast data by using the feedback correction parameter.

With reference to the third aspect, in a first implementation manner of the third aspect, the acquiring a feedback correction parameter according to the second-granularity data set includes:

acquiring at least two first-granularity data subsets of the first-granularity data set;

performing forecasting by using the first-granularity forecasting model to obtain at least two pieces of first-granularity forecast data, where the at least two pieces of first-granularity forecast data correspond to the first-granularity data subsets one to one;

obtaining at least two substep feedback correction parameters according to the at least two pieces of first-granularity forecast data and the second-granularity data set, where the substep feedback correction parameters correspond to the at least two pieces of first-granularity forecast data one to one; and obtaining the feedback correction parameter according to the at least two substep feedback correction parameters.

With reference to the first implementation manner of the third aspect, in a second implementation manner of the third aspect, the at least two first-granularity data subsets include a first-granularity data subset A, and the first-granularity data subset A corresponds to first-granularity forecast data A; and the obtaining at least two substep feedback correction parameters according to the at least two pieces of first-granularity forecast data and the second-granularity data set includes:

aggregating the first-granularity forecast data A into second-granularity data A;

acquiring, from the second-granularity data set, second-granularity data B corresponding to the second-granularity data A; and obtaining, according to the second-granularity data A and the second-granularity data B, a substep feedback correction parameter corresponding to the first-granularity forecast data A.

With reference to the second implementation manner of the third aspect, in a third implementation manner of the third aspect, the substep feedback correction parameter corresponding to the first-granularity forecast data A is obtained by means of calculation by using the following formula:

$$\lambda = \frac{S_{realB}}{S_{forecastA}} - 1;$$

where

λ is the substep feedback correction parameter corresponding to the first-granularity forecast data A, $S_{realB}$ is the second-granularity data B, and $S_{forecastA}$ is the second-granularity data A.

According to a fourth aspect, a data processing apparatus is provided and includes:

a historical data acquiring unit, configured to acquire historical data;

a data set generation unit, configured to generate, from the historical data acquired by the historical data acquiring unit, a first-granularity data set according to a first granularity, and generate, from the historical data, a second-granularity data set according to a second granularity, where data set coarse-and-fine granularities of the first-granularity data set and the second-granularity data set are different, that the coarse-and-fine granularities of the data sets are different means that levels of data sources are different, and that the levels of data sources are different means that time lengths of data sources are different, space sizes of data sources are different, organization level ranks of data sources are different, and user quantities of data sources are different; where in a coarse-and-fine granularity comparison relationship, a data set coarse-and-fine granularity of the first-granularity data set is coarser than that of the second-granularity data set, that is, the first-granularity data set is larger than and includes the second-granularity data set;

a modeling unit, configured to perform modeling for a second-granularity forecasting model according to the first-granularity data set and the second-granularity data set that are generated by the data set generation unit; and a forecast unit, configured to perform forecasting by using the second-granularity forecasting model obtained by the modeling unit, so as to obtain second-granularity forecast data.

With reference to the fourth aspect, in a first implementation manner of the fourth aspect, the modeling unit is specifically configured to:

acquire a maximum-likelihood estimation MLE model of the second-granularity data set;

acquire a penalty coefficient product correction term of an accumulative sum of the first-granularity data set;

perform correction on the MLE model of the second-granularity data set by using the penalty coefficient product correction term of the accumulative sum of the first-granularity data set; and complete the modeling for the second-granularity forecasting model by using a corrected MLE model of the second-granularity data set.

With reference to the fourth aspect or the first implementation manner of the fourth aspect, in a second implementation manner of the fourth aspect, the apparatus further includes:

a smooth parameter acquiring unit, configured to acquire a smooth parameter according to the first-granularity data set generated by the data set generation unit; and a smooth correction unit, configured to perform, by using the smooth parameter acquired by the smooth parameter acquiring unit, smooth correction on the second-granularity forecast data obtained by the forecast unit.

With reference to the second implementation manner of the fourth aspect, in a third implementation manner of the fourth aspect, the smooth parameter acquiring unit is specifically configured to:

perform modeling for a first-granularity forecasting model according to the first-granularity data set;

acquire at least two first-granularity data subsets of the first-granularity data set, where amounts of first-granularity data respectively included in the at least two first-granularity data subsets increase in sequence, and a data subset with a larger amount of data includes all data included in a data subset with a smaller amount of data;

perform forecasting by using the first-granularity forecasting model to obtain at least two pieces of first-granularity forecast data, where the at least two pieces of first-granularity forecast data correspond to the first-granularity data subsets one to one;

obtain at least two substep smooth parameters according to the at least two pieces of first-granularity forecast data, where the substep smooth parameters correspond to the at least two pieces of first-granularity forecast data one to one; and obtain the smooth parameter according to the at least two substep smooth parameters.

With reference to the third implementation manner of the fourth aspect, in a fourth implementation manner of the fourth aspect, the at least two first-granularity data subsets include a first-granularity data subset A, and the first-granularity data subset A corresponds to first-granularity forecast data A; and the smooth parameter acquiring unit specifically obtains a substep smooth parameter corresponding to the first-granularity forecast data A in the following manner:

aggregating the first-granularity forecast data A into second-granularity data A;

acquiring, from the second-granularity data set, second-granularity data B corresponding to the second-granularity data A; and obtaining, according to the second-granularity data A and the second-granularity data B, the sub step smooth parameter corresponding to the first-granularity forecast data A.

With reference to the fourth implementation manner of the fourth aspect, in a fifth implementation manner of the fourth aspect, the smooth parameter acquiring unit specifically obtains the sub step smooth parameter corresponding to the first-granularity forecast data A by means of calculation by using the following formula:

$$\lambda = \frac{S_{realB}}{S_{forecastA}} - 1;$$

where $\lambda$ is the substep smooth parameter corresponding to the first-granularity forecast data A, $S_{realB}$ is the second-granularity data B, and $S_{forecastA}$ is the second-granularity data A.

With reference to the fourth aspect and the second to the fifth implementation manners of the fourth aspect, in a sixth implementation manner of the fourth aspect, the data set generation unit is further configured to generate, from the historical data, a third-granularity data set according to a third granularity, where the third granularity is coarser than the second granularity; and the apparatus further includes:

a feedback correction parameter acquiring unit, configured to acquire a feedback correction parameter according to the third-granularity data set generated by the data set generation unit; and a feedback correction unit, configured to perform, by using the feedback correction parameter acquired by the feedback correction parameter acquiring unit, feedback correction on the second-granularity forecast data obtained by the forecast unit.

With reference to the sixth implementation manner of the fourth aspect, in a seventh implementation manner of the fourth aspect, the feedback correction parameter acquiring unit specifically acquires the feedback correction parameter in the following manner:

acquiring at least two second-granularity data subsets of the second-granularity data set;

performing forecasting by using the second-granularity forecasting model to obtain at least two pieces of second-granularity forecast data, where the at least two pieces of second-granularity forecast data correspond to the second-granularity data subsets one to one;

obtaining at least two substep feedback correction parameters according to the at least two pieces of second-granularity forecast data and the third-granularity data set, where the substep feedback correction parameters correspond to the at least two pieces of second-granularity forecast data one to one; and obtaining the feedback correction parameter according to the at least two substep feedback correction parameters.

With reference to the seventh implementation manner of the fourth aspect, in an eighth implementation manner of the fourth aspect, the at least two second-granularity data subsets include a second-granularity data subset C, and the second-granularity data subset C corresponds to second-granularity forecast data C; and the feedback correction parameter acquiring unit specifically obtains a substep feedback correction parameter corresponding to the second-granularity forecast data C in the following manner:

aggregating the second-granularity forecast data C into third-granularity data C;

acquiring, from the third-granularity data set, third-granularity data D corresponding to the third-granularity data C; and obtaining, according to the second-granularity data C and the third-granularity data D, a substep feedback correction parameter corresponding to the second-granularity forecast data C.

With reference to the eighth implementation manner of the fourth aspect, in a ninth implementation manner of the fourth aspect, the feedback correction parameter acquiring unit specifically obtains the substep feedback correction parameter corresponding to the second-granularity forecast data C by means of calculation by using the following formula:

$$\lambda = \frac{S_{realD}}{S_{forecastC}} - 1;$$

where $\lambda$ is the substep feedback correction parameter corresponding to the second-granularity forecast data C, $S_{realD}$ is the third-granularity data D, and $S_{forecastC}$ is the third-granularity data C.

According to a fifth aspect, a data processing apparatus is provided and includes:

a historical data acquiring unit, configured to acquire historical data;

a data set generation unit, configured to generate, from the historical data acquired by the historical data acquiring unit, a first-granularity data set according to a first granularity, and generate, from the historical data, a second-granularity data set according to a second granularity, where data set coarse-and-fine granularities of the first-granularity data set and the second-granularity data set are different, that the coarse-and-fine granularities of the data sets are different means that levels of data sources are different, and that the levels of data sources are different means that time lengths of data sources are different, space sizes of data sources are different, organization level ranks of data sources are different, and user quantities of data sources are different; where in a coarse-and-fine granularity comparison relationship, a data set coarse-and-fine granularity of the first-granularity data set is coarser than that of the second-granularity data set, that is, the first-granularity data set is larger than and includes the second-granularity data set;

a modeling unit, configured to perform modeling for a second-granularity forecasting model according to the second-granularity data set generated by the data set generation unit; and a forecast unit, configured to perform forecasting by using the second-granularity forecasting model obtained by the modeling unit, so as to obtain second-granularity forecast data;

a smooth parameter acquiring unit, configured to acquire a smooth parameter according to the first-granularity data set generated by the data set generation unit; and a smooth correction unit, configured to perform, by using the smooth parameter acquired by the smooth parameter acquiring unit, smooth correction on the second-granularity forecast data obtained by the forecast unit.

With reference to the fifth aspect, in a first implementation manner of the fifth aspect, the smooth parameter acquiring unit specifically acquires the smooth parameter in the following manner:

performing modeling for a first-granularity forecasting model according to the first-granularity data set;

acquiring at least two first-granularity data subsets of the first-granularity data set, where amounts of first-granularity data respectively included in the at least two first-granularity data subsets increase in sequence, and a data subset with a larger amount of data includes all data included in a data subset with a smaller amount of data;

performing forecasting by using the first-granularity forecasting model to obtain at least two pieces of first-granu-larity forecast data, where the at least two pieces of first-granularity forecast data correspond to the first-granularity data subsets one to one;

obtaining at least two substep smooth parameters according to the at least two pieces of first-granularity forecast data, where the substep smooth parameters correspond to the at least two pieces of first-granularity forecast data one to one; and obtaining the smooth parameter according to the at least two substep smooth parameters.

With reference to the first implementation manner of the fifth aspect, in a second implementation manner of the fifth aspect, the at least two first-granularity data subsets include a first-granularity data subset A, and the first-granularity data subset A corresponds to first-granularity forecast data A; and the smooth parameter acquiring unit is specifically configured to obtain a substep smooth parameter corresponding to the first-granularity forecast data A in the following manner:

aggregating the first-granularity forecast data A into second-granularity data A;

acquiring, from the second-granularity data set, second-granularity data B corresponding to the second-granularity data A; and obtaining, according to the second-granularity data A and the second-granularity data B, the sub step smooth parameter corresponding to the first-granularity forecast data A.

With reference to the second implementation manner of the fifth aspect, in a third implementation manner of the fifth aspect, the smooth parameter acquiring unit is specifically configured to obtain the substep smooth parameter corresponding to the first-granularity forecast data A by means of calculation by using the following formula:

$$\lambda = \frac{S_{realB}}{S_{forecastA}} - 1;$$

where $\lambda$ is the substep smooth parameter corresponding to the first-granularity forecast data A, $S_{realB}$ is the second-granularity data B, and $S_{forecastA}$ is the second-granularity data A.

With reference to the fifth aspect and any of the first to third implementation manners of the fifth aspect, in a fourth implementation of the fifth aspect, the data set generation unit is further configured to generate, from the historical data, a third-granularity data set according to a third granularity, where the third granularity is coarser than the second granularity; and the apparatus further includes:

a feedback correction parameter acquiring unit, configured to acquire a feedback correction parameter according to the third-granularity data set generated by the data set generation unit; and a feedback correction unit, configured to perform, by using the feedback correction parameter acquired by the feedback correction parameter acquiring unit, feedback correction on the second-granularity forecast data obtained by the forecast unit.

With reference to the fourth implementation manner of the fifth aspect, in a fifth implementation manner of the fifth aspect, the feedback correction parameter acquiring unit is specifically configured to acquire the feedback correction parameter in the following manner:

acquiring at least two second-granularity data subsets of the second-granularity data set;

performing forecasting by using the second-granularity forecasting model to obtain at least two pieces of second-granularity forecast data, where the at least two pieces of second-granularity forecast data correspond to the second-granularity data subsets one to one;

obtaining at least two substep feedback correction parameters according to the at least two pieces of second-granularity forecast data and the third-granularity data set, where the substep feedback correction parameters correspond to the at least two pieces of second-granularity forecast data one to one; and obtaining the feedback correction parameter according to the at least two substep feedback correction parameters.

With reference to the fifth implementation manner of the fifth aspect, in a sixth implementation manner of the fifth aspect, the at least two second-granularity data subsets include a second-granularity data subset C, and the second-granularity data subset C corresponds to second-granularity forecast data C; and the feedback correction parameter acquiring unit is specifically configured to obtain a substep feedback correction parameter corresponding to the second-granularity forecast data C in the following manner:

aggregating the second-granularity forecast data C into third-granularity data C;

acquiring, from the third-granularity data set, third-granularity data D corresponding to the third-granularity data C; and obtaining, according to the second-granularity data C and the third-granularity data D, a substep feedback correction parameter corresponding to the second-granularity forecast data C.

With reference to the sixth implementation manner of the fifth aspect, in a seventh implementation manner of the fifth aspect, the feedback correction parameter acquiring unit is specifically configured to obtain the substep feedback correction parameter corresponding to the second-granularity forecast data C by means of calculation by using the following formula:

$$\lambda = \frac{S_{realD}}{S_{forecastC}} - 1;$$

where $\lambda$ is the substep feedback correction parameter corresponding to the second-granularity forecast data C, $S_{realD}$ is the third-granularity data D, and $S_{forecastC}$ is the third-granularity data C.

With reference to the fifth aspect and any of the first to the seventh implementation manners of the fifth aspect, in an eighth implementation manner of the fifth aspect, the modeling unit performs the modeling for the second-granularity forecasting model only by using the second-granularity data set; or performs the modeling for the second-granularity forecasting model by using the first-granularity data set and the second-granularity data set.

According to a sixth aspect, a data processing apparatus is provided and includes:

a historical data acquiring unit, configured to acquire historical data;

a data set generation unit, configured to generate, from the historical data acquired by the historical data acquiring unit, a first-granularity data set according to a first granularity, and generate, from the historical data, a second-granularity data set according to a second granularity, where data set coarse-and-fine granularities of the first-granularity data set and the second-granularity data set are different, that the coarse-and-fine granularities of the data sets are different means that levels of data sources are different, and that the levels of data sources are different means that time lengths of data sources are different, space sizes of data sources are different, organization level ranks of data sources are different, and user quantities of data sources are different; where in a coarse-and-fine granularity comparison relationship, a data set coarse-and-fine granularity of the first-granularity data set is coarser than that of the second-granularity data set, that is, the first-granularity data set is larger than and includes the second-granularity data set;

a modeling unit, configured to perform modeling for a first-granularity forecasting model according to the first-granularity data set generated by the data set generation unit;

a forecast unit, configured to perform forecasting by using the first-granularity forecasting model obtained by the modeling unit, so as to obtain first-granularity forecast data;

a feedback correction parameter acquiring unit, configured to acquire a feedback correction parameter according to the second-granularity data set generated by the data set generation unit; and a feedback correction unit, configured to perform, by using the feedback correction parameter acquired by the feedback correction parameter acquiring unit, feedback correction on the first-granularity forecast data obtained by the forecast unit.

With reference to the sixth aspect, in a first implementation manner of the sixth aspect, the feedback correction parameter acquiring unit is specifically configured to acquire the smooth parameter in the following manner:

acquiring at least two first-granularity data subsets of the first-granularity data set;

performing forecasting by using the first-granularity forecasting model to obtain at least two pieces of first-granularity forecast data, where the at least two pieces of first-granularity forecast data correspond to the first-granularity data subsets one to one;

obtaining at least two substep feedback correction parameters according to the at least two pieces of first-granularity forecast data and the second-granularity data set, where the substep feedback correction parameters correspond to the at least two pieces of first-granularity forecast data one to one; and obtaining the feedback correction parameter according to the at least two substep feedback correction parameters.

With reference to the first implementation manner of the sixth aspect, in a second implementation manner of the sixth aspect, the at least two first-granularity data subsets include a first-granularity data subset A, and the first-granularity data subset A corresponds to second-granularity forecast data A; and the feedback correction parameter acquiring unit specifically obtains a substep feedback correction parameter corresponding to the first-granularity forecast data A in the following manner:

aggregating the first-granularity forecast data A into second-granularity data A;

acquiring, from the second-granularity data set, second-granularity data B corresponding to the second-granularity data A; and obtaining, according to the first-granularity data A and the second-granularity data B, a substep feedback correction parameter corresponding to the first-granularity forecast data A.

With reference to the second implementation manner of the sixth aspect, in a third implementation manner of the sixth aspect, the feedback correction parameter acquiring unit specifically obtains the substep feedback correction parameter corresponding to the first-granularity forecast data A by means of calculation by using the following formula:

$$\lambda = \frac{S_{realB}}{S_{forecastA}} - 1;$$

where

λ is the substep feedback correction parameter corresponding to the first-granularity forecast data A, $S_{realB}$ is the second-granularity data B, and $S_{forecastA}$ is the second-granularity data A.

It may be learned from the foregoing technical solutions provided in the embodiments of the present invention that, in the embodiments of the present invention, because a second-granularity forecasting model is established with reference to both a first-granularity data set and a second-granularity data set, forecasting performed by using the second-granularity forecasting model is affected by the first-granularity data set; therefore, second-granularity forecast data obtained by using the second-granularity forecasting model tends to be consistent with first-granularity data, making the second-granularity forecast data more precise. Further, a smooth parameter may be further acquired according to the first-granularity data set, and the smooth parameter may be further used to perform smooth correction on the second-granularity forecast data, so that second-granularity forecast data obtained after the smooth correction further tends to be consistent with the first-granularity data. Further, a feedback correction parameter may be further acquired according to a third-granularity data set, and the feedback correction parameter may be further used to perform feedback correction on the second-granularity forecast data, so that second-granularity forecast data obtained after the feedback correction further tends to be consistent with third-granularity data.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A data processing method provided in the embodiments of the present invention is first described. The data processing method is used to forecast future data according to acquired historical data, so that a decision-maker can perform forecasting according to a forecasting result. With the data processing method provided in the embodiments of the present invention, a situation in which forecast data of different granularities is inconsistent does not occur or at least a situation in which forecast data of different granularities has a relatively great difference does not occur, that is, compared with the prior art, a forecasting result is more accurate, so that a decision made by a decision-maker according to the forecasting result is as close as possible to an actual future situation, thereby avoiding labor and resource wastes caused by a decision-making mistake.

The data processing method provided in the embodiments of the present invention may be executed by an outsourcing service planning system, and a specific manifestation form of a forecasting system may be a computer or a computer cluster. It should be understood that, the data processing method provided in the embodiments of the present invention may alternatively be executed by another forecasting system, and the present invention sets no limitation on a type of forecasting system to which the data processing method provided in the embodiments of the present invention is applied.

Figure 1:
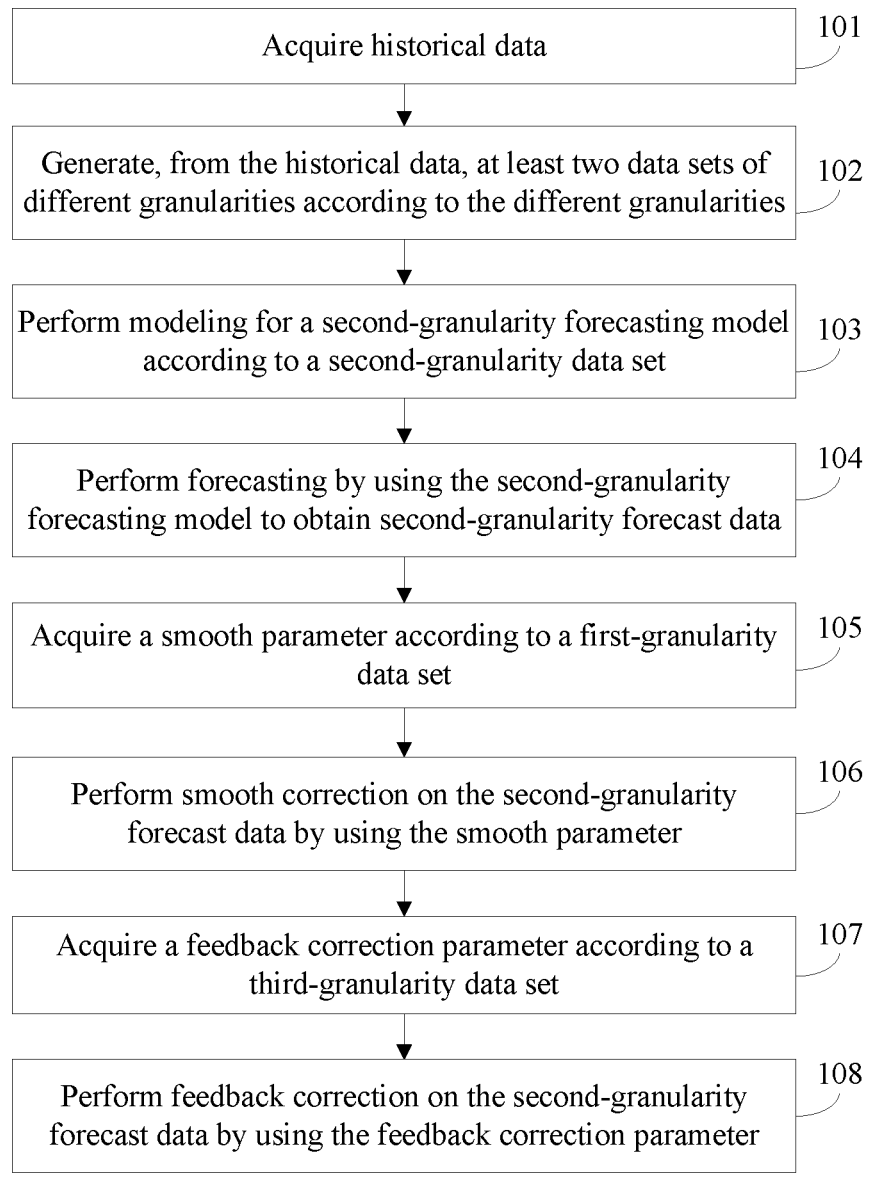
FIG. 1 is a flowchart of a data processing method according to an embodiment of the present invention.

FIG. 1 shows a process of a data processing method according to an embodiment of the present invention, where the process includes the following steps:

101: Acquire historical data, where the historical data belongs to a first level and a second level, and data corresponding to the first level includes data corresponding to the second level.

The historical data may be specifically acquired from a database of a local computer, or the historical data is acquired from a server that stores historical data. The historical data may be specifically historical data of various resource requirements, for example, historical data of a labor requirement, historical data of a material requirement, network use data of a user, and call record data of a user, and a specific manifestation form may be a character that can reflect a data amount size, such as a digit, a letter, or a Chinese character.

102: Generate, from the historical data, at least two data sets of different granularities according to the different granularities. Specifically, the generating at least two data sets of different granularities at least includes generating, from the historical data, a first-granularity data set according to a first granularity, and generating, from the historical data, a second-granularity data set according to a second granularity, where the first granularity is finer than the second granularity, and the first granularity and the second granularity respectively correspond to the first level and the second level.

It may be understood that, in an actual application, how many data sets of different granularities need to be generated according to the historical data may be determined according to a specific requirement. When at least two data sets of different granularities are generated from the historical data according to the different granularities, the generated at least two data sets of different granularities are arranged according to a fine-to-coarse sequence of granularities. For example, in an outsourcing service planning system, data sets of different granularities may be generated from historical data according to different sources, for example, a project-granularity data set, a region-granularity data set, and a department-granularity data set may be generated from historical data according to different organization level ranks of data sources, where a region granularity is coarser than a project granularity, and a department granularity is coarser than the region granularity.

Further, the first level and the second level respectively include: a first space level and a second space level, a first time level and a second time level, a first organization level and a second organization level, or a first quantity level and a second quantity level, where the first time level and the second time level refer to two levels that have different time lengths and to which the data belonging to the first level and the data belonging to the second level respectively belong; the first space level and the second space level refer to two levels that have different space sizes and to which the data belonging to the first level and the data belonging to the second level respectively belong; the first organization level and the second organization level refer to two levels that have different organization level ranks and to which the data belonging to the first level and the data belonging to the second level respectively belong; the first quantity level and the second quantity level refer to two levels that have different user quantities and to which the data belonging to the first level and the data belonging to the second level respectively belong; wherein in a level comparison relationship, the first level is higher than the second level, that is, the first-granularity data set corresponding to the first level is larger than and includes the second-granularity data set corresponding to the second level.

Data sets of different coarse-and-fine granularities are obtained by means of division according to different space levels corresponding to the historical data, where a space level rank corresponds to a data set coarse-and-fine granularity. For example, division may be performed directly according to a space size of a data source, for example, data generated in different regions with areas such as 1000 square kilometers, 100 square kilometers, and 10 square kilometers may be directly used to differentiate space sizes of sources of historical data; data sets of coarse and fine granularities may alternatively correspond to geographical regions obtained through division, for example, space sizes may be divided according to geographical regions such as country, province, city, town, and village.

A level relationship may be generated from the historical data according to a time unit of measurement, and different levels correspond to different granularities, for example, a data set of a day granularity is generated according to a time unit of day, a data set of a week granularity is generated according to a time unit of week, and a data set of a month granularity is generated according to a unit of month. By analogy, a comparison relationship exists between granularity properties of different granularities, and there is a granularity property comparison relationship between a data set of a coarse granularity and a data set of a fine granularity, that is, a definition of a coarse-granularity property includes a definition of a fine-granularity property. For example, a time unit of week includes a time unit of day; in this case, week is a coarse granularity, and day is a fine granularity.

Different coarse and fine granularities may alternatively be differentiated according to different levels of data amount sizes, that is, data sets of different granularities are differentiated according to different user quantities. For example, user quantities from large to small correspond to coarse-and-fine granularities from coarse to fine, and also correspond to levels from low to high, where a data set of a fine granularity is included in a data set of a coarse granularity. In this case, with a forecasting model being established according to data sets of different user quantities, a difference of a cluster in which a forecast target is located is highlighted, and consistency of an environment in which a target cluster is located is also considered, which effectively improves forecasting accuracy.

In summary, data set coarse-and-fine granularities of the first-granularity data set and the second-granularity data set are different, and levels corresponding to the first-granularity data set and the second-granularity data set are also different, where the different coarse-and-fine granularities of the data sets correspond to different levels, and that levels of data sources are different includes: time lengths of data sources are different, space sizes of data sources are different, organization level ranks of data sources are different, and user quantities of data sources are different. In a coarse-and-fine granularity comparison relationship, a data set coarse-and-fine granularity of the first-granularity data set is coarser than that of the second-granularity data set, that is, the first-granularity data set is larger than and includes the second-granularity data set. In the following, that a project-granularity data set, a region-granularity data set, and a department-granularity data set are generated from the historical data according to different organization level ranks of data sources is used for detailed descriptions. For another dimension of a different coarse-and-fine granularity, for example, in scenarios in which coarse-and-fine granularities are differentiated according to a difference in time lengths, a difference in user quantities, or a difference in space sizes, principles are similar, and the scenarios can be implemented by making a simple variation according to a requirement and based on this embodiment of the present invention, which is not described in detail herein again.

103: Perform modeling for a second-granularity forecasting model according to the second-granularity data set.

The modeling for the second-granularity forecasting model may be performed according to only the second-granularity data set based on a specific requirement, or the modeling for the second-granularity forecasting model may be performed according to both the first-granularity data set and the second-granularity data set.

Figure 2:
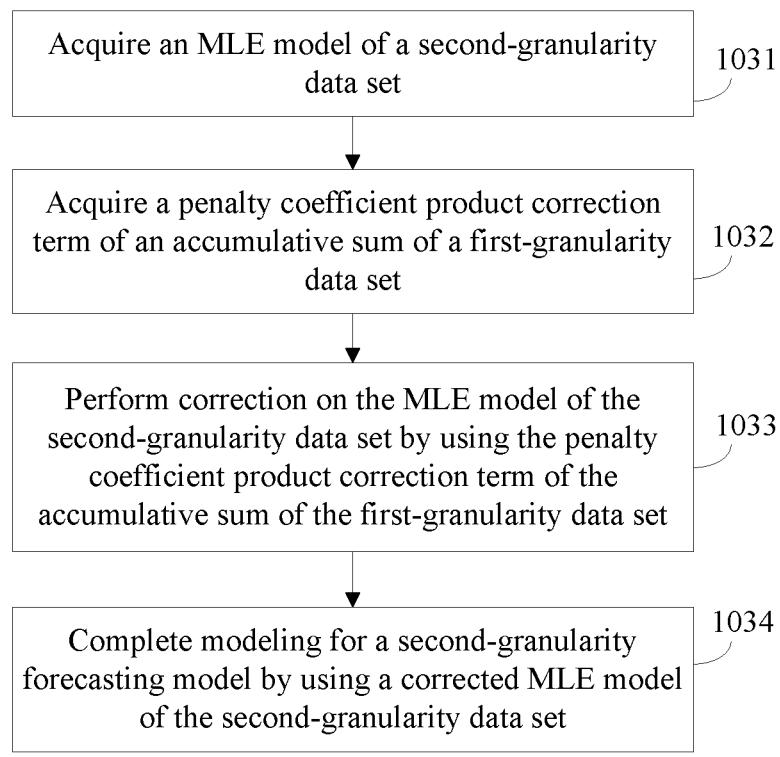
FIG. 2 is a flowchart of a modeling method according to an embodiment of the present invention.

Specifically, when the modeling for the second-granularity forecasting model is performed according to both the first-granularity data set and the second-granularity data set, the modeling may be specifically performed in a manner shown in FIG. 2:

1031: Acquire a Maximum Likelihood Estimation (MLE) model of the second-granularity data set.

1032: Acquire a penalty coefficient product correction term of an accumulative sum of the first-granularity data set.

1033: Perform correction on the MLE model of the second-granularity data set by using the penalty coefficient product correction term of the accumulative sum of the first-granularity data set.

1034: Complete the modeling for the second-granularity forecasting model by using a corrected MLE model of the second-granularity data set.

That is, when modeling for a current-granularity forecasting model is performed, correction is performed by using a penalty coefficient product correction term of an accumulative sum of a neighboring fine-granularity data set, so that an obtained forecasting model comprehensively considers a current-granularity data set and the neighboring fine-granularity data set. Therefore, forecast data of the forecasting model considers situations of both the current-granularity data set and the neighboring fine-granularity data set, and the forecast data is relatively accurate.

In a specific modeling process, an autoregressive-moving-average model (ARMA: Auto-Regressive and Moving Average Model) (p, q) may be used, and an ARMA model may be specifically expressed in the following calculation formula:

$\phi(B)w_t = \theta(B)a_t$, $t=1, 2, L n$; where $\phi(B)$ indicates an autoregressive multinomial $\phi(B) = 1 - \varphi_1 B - \varphi_2 B^2 - L - \varphi_p B^p$;

$\theta(B)$ indicates a moving-average multinomial $\theta(B) = 1 - \vartheta_1 B - \vartheta_2 B^2 - L - \vartheta_q B^q$;

P is an autoregressive model order;

q is a moving-average model order;

B indicates backward operation arithmetic, for example, $Bw_t = w_{t-1}$ and $Ba_t = a_{t-1}$;

$w_t$ is time sequence data, which is a sequential sequence;

$a_t$ is noise of an existing sample; and n is a quantity of existing samples.

A specific modeling process includes a process of acquiring a parameter value for the following calculation formula:

$$\min \sum_t (\hat{w}_t - w_t)^2 + \lambda \sum_t \left(\hat{w}_t - \sum_k \hat{w}_{tk}\right),$$

that is, for acquiring a series of parameters that enable a value of $$\sum_t (\hat{w}_t - w_t)^2 + \lambda \sum_t \left(\hat{w}_t - \sum_k \hat{w}_{tk}\right)$$

to be minimum, where a value of $\lambda$ ranges between $[0,1)$, and a specific value may be set according to experience or an actual requirement;

$$\sum_t \left(\hat{w}_t - \sum_k \hat{w}_{tk}\right)$$

is the foregoing to-be-acquired penalty coefficient product correction term of the accumulative sum of the first-granularity data set; where $$\hat{w}_t = \left(\sum_{j=1}^{p} \varphi_j w_{t-j} - \sum_{i=1}^{q} \vartheta_i a_{t-i}\right), t = 1, 2, L, n;$$

-continued $$\hat{w}_{tk} = \left(\sum_{j=1}^{p} \varphi_{jk} w_{tk-j} - \sum_{i=1}^{q} \vartheta_{ik} a_{tk-i}\right), t = 1, 2, L, n;$$

$w_{tk}$ is data of the neighboring fine-granularity data set; and $w_t$ is the foregoing time sequence data, which indicates current-granularity data and is obtained by aggregating data in the neighboring fine-granularity data set, that is, $$w_t = \sum_k w_{tk},$$

where k indicates an amount of fine-granularity data that is in the fine-granularity data set and corresponds to current data in the current-granularity data set.

104: Perform forecasting by using the second-granularity forecasting model to obtain second-granularity forecast data.

When forecasting is performed by using the second-granularity forecasting model, input data may be the foregoing historical data or a subset of the foregoing historical data, or may be the foregoing historical data or a subset of the foregoing historical data and some new data, or may be completely new data. For example, the historical data includes data of January to October 2014, and data of December 2014 is to be forecasted; the input data may be the data of January to October 2014, or may be data of January 2013 to October 2014, or may be data of January to November 2014, or may be data of August to October 2014, or may be data of July to November 2014, or may be data of November 2014, or the like. Which data is specifically used as the input data may be selected according to a specific requirement.

When the second-granularity forecasting model is obtained according to both the first-granularity data set and the second-granularity data set, the second-granularity forecast data obtained in step 104 may serve as output of the forecasting system, for example, an outsourcing service planning system.

Certainly, when the second-granularity forecasting model is obtained according to only the second-granularity data set, or more precise output needs to be obtained although the second-granularity forecasting model is obtained according to both the first-granularity data set and the second-granularity data set, the data processing method provided in this embodiment of the present invention may further include the following steps.

105: Acquire a smooth parameter according to the first-granularity data set.

Figure 3:
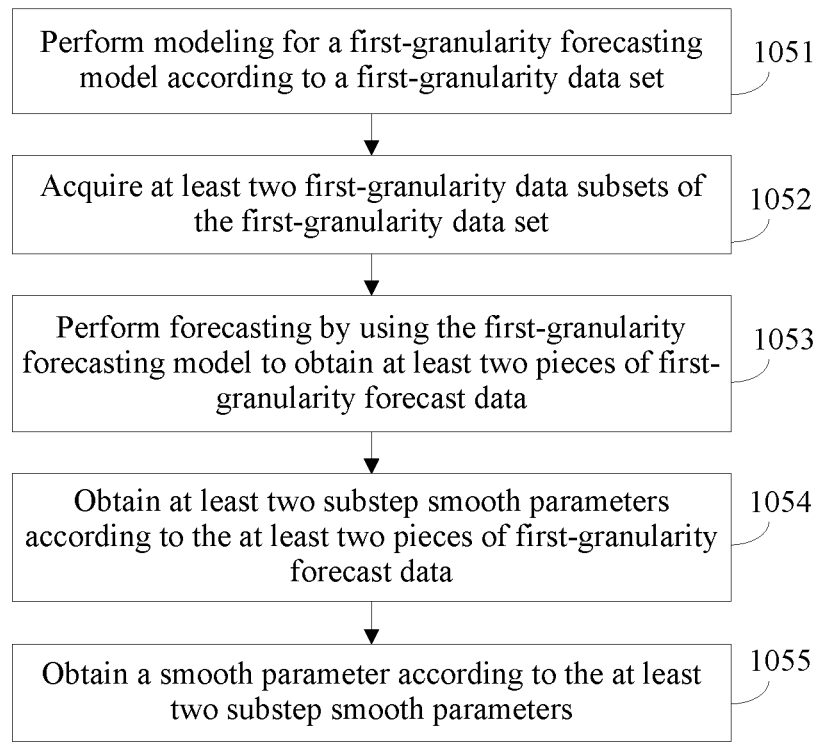
FIG. 3 is a flowchart of a smooth parameter acquiring method according to an embodiment of the present invention.

Specifically, the smooth parameter may be acquired in a manner shown in FIG. 3:

1051: Perform modeling for a first-granularity forecasting model according to the first-granularity data set.

When the first granularity is a finest granularity, the modeling for the first-granularity forecasting model may be performed according to only the first-granularity data set. If there is a granularity finer than the first granularity, the modeling for the first-granularity forecasting model may be performed according to the first-granularity data set and a data set of the finer granularity. For execution of a specific modeling process, refer to step 103, which is not described herein again.

1052: Acquire at least two first-granularity data subsets of the first-granularity data set, where amounts of first-granularity data respectively included in the at least two first-granularity data subsets increase in sequence, and a data subset with a larger amount of data includes all data included in a data subset with a smaller amount of data.

For example, the historical data includes data from 2001 to 2010, and the at least two first-granularity data subsets include first-granularity data subsets A, B, and C. The first-granularity data subset A includes data from 2001 to 2007 (that is, 70% data of the first-granularity data set), the first-granularity data subset B includes data from 2001 to 2008 (that is, 80% data of the first-granularity data set), and the first-granularity data subset C includes data from 2001 to 2009 (that is, 90% data of the first-granularity data set). Therefore, the first-granularity data subsets A, B, and C increase in sequence, the first-granularity data subset B includes all data included in the first-granularity data subset A, and the first-granularity data subset C includes all data included in the first-granularity data subset B. It may be understood that, how many first-granularity data subsets are specifically acquired and how much data is included in each first-granularity data subset may both be determined according to a requirement, which is not specifically limited in this embodiment of the present invention.

1053: Perform forecasting by using the first-granularity forecasting model to obtain at least two pieces of first-granularity forecast data, where the at least two pieces of first-granularity forecast data correspond to the first-granularity data subsets one to one.

For each first-granularity data subset, one piece of first-granularity forecast may be obtained by using the first-granularity forecast model.

1054: Obtain at least two substep smooth parameters according to the at least two pieces of first-granularity forecast data, where the substep smooth parameters correspond to the at least two pieces of first-granularity forecast data one to one.

Figure 4:
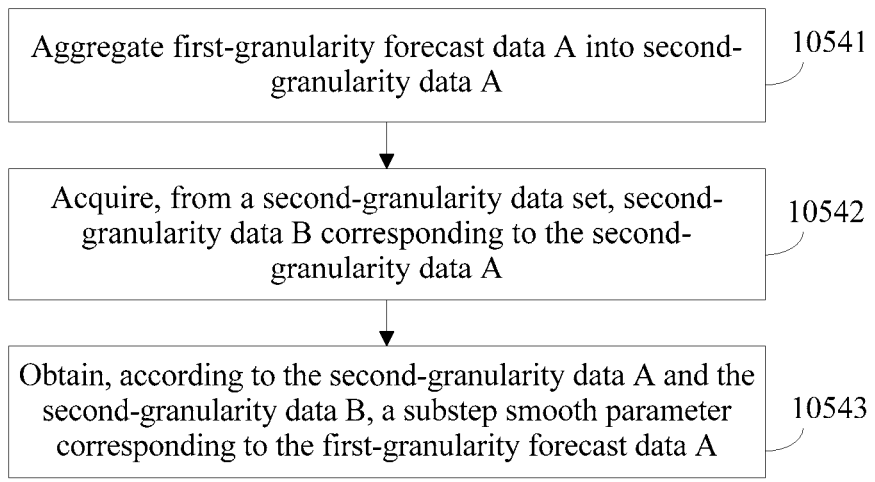
FIG. 4 is a flowchart of a substep smooth parameter acquiring method according to an embodiment of the present invention.

For example, the foregoing at least two first-granularity data subsets include a first-granularity data subset A, and the first-granularity data subset A corresponds to first-granularity forecast data A; the at least two substep smooth parameters may be obtained according to the at least two pieces of first-granularity forecast data in a manner shown in FIG. 4:

10541: Aggregate the first-granularity forecast data A into second-granularity data A.

The aggregation may be simple accumulation. For example, a region has three projects, and a labor resource requirement of each project is forecasted; labor resource requirements of the three projects may be simply accumulated to obtain a labor resource requirement of the region. Certainly, accumulation may alternatively be performed, according to weights of different projects, after the different projects are weighted.

10542: Acquire, from the second-granularity data set, second-granularity data B corresponding to the second-granularity data A.

The acquired second-granularity data B corresponds to the second-granularity data A. For example, the historical data includes the data of January to October 2014, and the first-granularity data subset A includes 70% data of the first-granularity data set, that is, includes the data of January to July 2014. In this case, the data of January to July 2014 may be used to forecast data of August 2014, and the data of August 2014 is the first-granularity forecast data A, which may be aggregated to obtain the second-granularity data A. In addition, because the historical data itself includes the data of January to October 2014, the second-granularity data B corresponding to the second-granularity data A may be directly acquired from the second-granularity data set, that is, the data of August 2014 may be directly acquired from the second-granularity data set.

10543: Obtain, according to the second-granularity data A and the second-granularity data B, a substep smooth parameter corresponding to the first-granularity forecast data A.

Specifically, the substep smooth parameter corresponding to the first-granularity forecast data A may be obtained by means of calculation by using the following formula:

$$\lambda = \frac{S_{realB}}{S_{forecastA}} - 1;$$

where $\lambda$ is the substep smooth parameter corresponding to the first-granularity forecast data A, $S_{realB}$ is the second-granularity data B, and $S_{forecastA}$ is the second-granularity data A.

It may be understood that, for each piece of first-granularity forecast data, a substep smooth parameter corresponding to the first-granularity forecast data may be acquired by using a method shown in FIG. 4.

1055: Obtain the smooth parameter according to the at least two substep smooth parameters.

Specifically, an average value of the at least two substep smooth parameters may be obtained, or a weighted average value of the at least two sub step smooth parameters may be obtained, so that the smooth parameter is finally obtained.

106: Perform smooth correction on the second-granularity forecast data by using the smooth parameter.

Specifically, the smooth correction may be performed on the second-granularity forecast data by using the following formula:

$$S_t = S'_t + \lambda \sum_{i=1}^{n} Sub_i;$$

Where $S_t$ is second-granularity forecast data obtained after the smooth correction, $S'_t$ is the second-granularity forecast data on which smooth correction is to be performed, $\lambda$ is the smooth parameter, and $$\sum_{i=1}^{n} Sub_i$$

is the aggregation of the first-granularity forecast data.

The second-granularity forecast data obtained from the smooth correction in step 106 may serve as output of the forecasting system, for example, an outsourcing service planning system. However, when more precise output needs to be obtained, the data processing method provided in this embodiment of the present invention may further include the following steps.

107: Acquire a feedback correction parameter according to a third-granularity data set.

The third-granularity data set is generated from the historical data according to a third granularity, where the third granularity is coarser than the second granularity, and the third-granularity data set may be generated in 102.

In this embodiment of the present invention, a process of acquiring the feedback correction parameter is the same as a process of acquiring the smooth parameter. In other words, a difference between the feedback correction parameter and the smooth parameter only lies in objects on which the feedback correction parameter and the smooth parameter are respectively used. For a current granularity, an obtained parameter is a feedback correction parameter when the obtained parameter is used on forecast data of a neighboring finer granularity, and is a smooth parameter when the obtained parameter is used on forecast data of a neighboring coarser granularity. Therefore, a specific process of acquiring the feedback correction parameter is no longer described in this embodiment of the present invention. For the specific acquiring process, refer to a specific implementation process in 105.

For example, when there is a granularity finer than the first granularity, the smooth correction parameter obtained in 105 may serve as a feedback correction parameter for forecast data of this finer granularity. Similarly, when there is a granularity coarser than the third granularity, the feedback correction parameter obtained in 107 may serve as a smooth correction parameter for forecast data of this coarser granularity.

108: Perform feedback correction on the second-granularity forecast data by using the feedback correction parameter.

Specifically, the feedback correction may be performed on the second-granularity forecast data by using the following formula:

$$Sub = (1+\lambda)Sub'; \text{ where}$$

Sub is second-granularity forecast data obtained after the feedback correction, $\lambda$ is the feedback correction parameter, and Sub' is the second-granularity forecast data on which the feedback correction is to be performed.

It should be noted that, if step 108 is performed before step 106, feedback correction is performed on the second-granularity forecast data obtained from forecasting, and in this case, the smooth correction performed in step 106 is specifically performed on the second-granularity forecast data obtained from the feedback correction in step 108; if step 108 is performed after step 106, the smooth correction performed in step 106 is smooth correction performed on the second-granularity forecast data obtained from the smooth correction.

The second-granularity forecast data obtained from the feedback correction in step 108 may serve as output of the forecasting system, for example, an outsourcing service planning system.

It may be understood that, in a specific implementation process of the data processing method, it is feasible that only steps 101 to 104 are performed; in this case, the modeling in step 103 may be performed according to both the first-granularity data set and the second-granularity data set. Alternatively, only steps 101 to 106 are performed; in this case, a modeling process in step 103 is not limited. Alternatively, only steps 101 to 104 and steps 107 and 108 are performed. Certainly, all of steps 101 to 108 are performed; in this case, step 106 may be performed before step 108, or may be performed after step 108.

In this embodiment, when a second-granularity forecasting model is established, reference may be made to both a first-granularity data set and a second-granularity data set, so that forecasting performed by using the second-granularity forecasting model is affected by the first-granularity data set; therefore, second-granularity forecast data obtained by using the second-granularity forecasting model tends to be consistent with first-granularity data, making the second-granularity forecast data more precise. Further, a smooth parameter may be further acquired according to the first-granularity data set, and the smooth parameter may be further used to perform smooth correction on the second-granularity forecast data, so that second-granularity forecast data obtained after the smooth correction further tends to be consistent with the first-granularity data. Further, a feedback correction parameter may be further acquired according to a third-granularity data set, and the feedback correction parameter may be further used to perform feedback correction on the second-granularity forecast data, so that second-granularity forecast data obtained after the feedback correction further tends to be consistent with third-granularity data.

Figure 5:
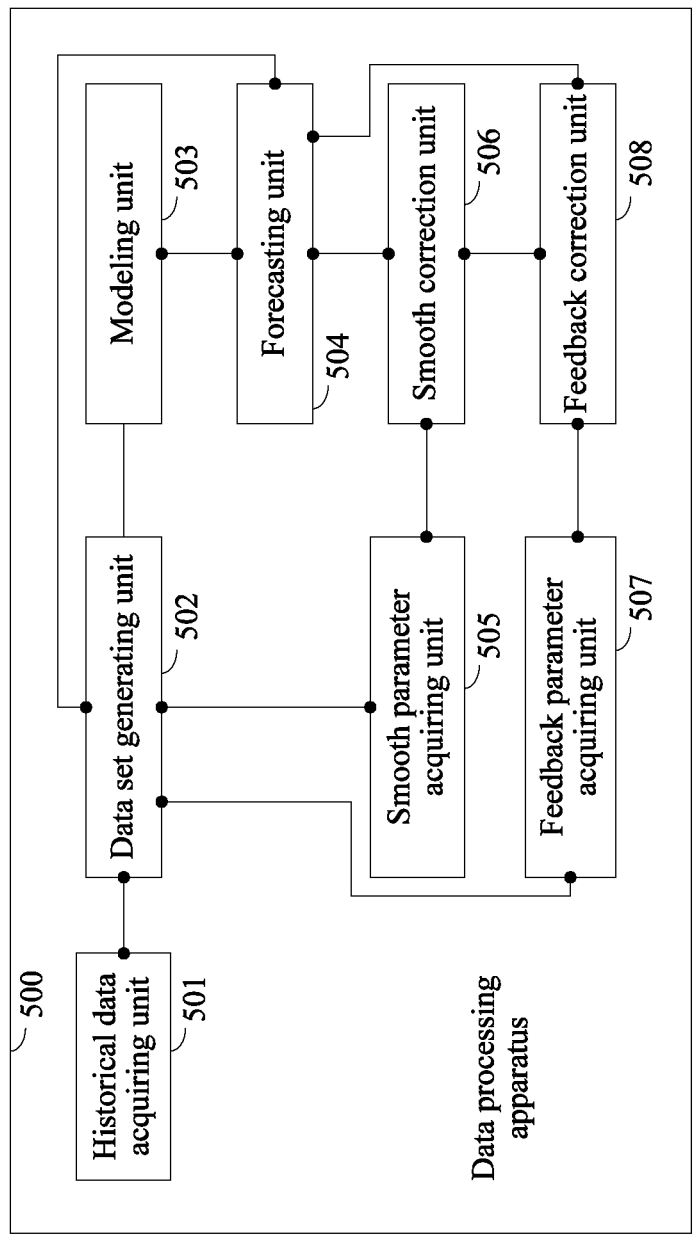
FIG. 5 is a structural diagram of a data processing apparatus according to an embodiment of the present invention.

It should be noted that, for ease of description, each foregoing method embodiment is described as a combination of a series of actions. However, persons skilled in the art should understand that the present invention is not limited to the sequence of the described actions, because some steps according to the present application may be performed in other sequences or concurrently. In addition, persons skilled in the art should also know that the embodiments described in the specification are exemplary embodiments, and the involved actions and modules are not necessarily required by the present invention The following then describes a data processing apparatus provided in this embodiment of the present invention. FIG. 5 shows a structure of a data processing apparatus 500 provided in an embodiment of the present invention, where the structure includes: a historical data acquiring unit 501, a data set generation unit 502, a modeling unit 503, and a forecast unit 504.

The historical data acquiring unit 501 is configured to acquire historical data, where the historical data belongs to a first level and a second level, and data corresponding to the first level comprises data corresponding to the second level.

For a specific implementation process of the historical data acquiring unit 501, refer to step 101.

The data set generation unit 502 is configured to generate, from the historical data acquired by the historical data acquiring unit 501, at least two data sets of different granularities according to the different granularities, where a first granularity and a second granularity respectively correspond to the first level and the second level; and the first level and the second level respectively comprise: a first space level and a second space level, a first time level and a second time level, a first organization level and a second organization level, or a first quantity level and a second quantity level. Specifically, the generating at least two data sets of different granularities includes generating a first-granularity data set according to the first granularity, and generating a second-granularity data set according to the second granularity, where the first granularity is coarser than the second granularity.

For a specific implementation process of the data set generation unit 502, refer to step 102. The first time level and the second time level refer to two levels that have different time lengths and to which the data belonging to the first level and the data belonging to the second level respectively belong; the first space level and the second space level refer to two levels that have different space sizes and to which the data belonging to the first level and the data belonging to the second level respectively belong; the first organization level and the second organization level refer to two levels that have different organization level ranks and to which the data belonging to the first level and the data belonging to the second level respectively belong; the first quantity level and the second quantity level refer to two levels that have different user quantities and to which the data belonging to the first level and the data belonging to the second level respectively belong; where in a level comparison relationship, the first level is higher than the second level, that is, the first-granularity data set of the first level is larger than and comprises the second-granularity data set of the second level.

The modeling unit 503 is configured to perform modeling for a second-granularity forecasting model according to the second-granularity data set generated by the data set generation unit 502.

Specifically, the modeling unit 503 may perform the modeling for the second-granularity forecasting model according to only the second-granularity data set, or may perform the modeling for the second-granularity forecasting model according to both the first-granularity data set and the second-granularity data set. When performing the modeling for the second-granularity forecasting model according to both the first-granularity data set and the second-granularity data set, the modeling unit 503 may be specifically configured to: acquire an MLE model of the second-granularity data set; acquire a penalty coefficient product correction term of an accumulative sum of the first-granularity data set; perform correction on the MLE model of the second-granularity data set by using the penalty coefficient product correction term of the accumulative sum of the first-granularity data set; complete the modeling for the second-granularity forecasting model by using a corrected MLE model of the second-granularity data set.

For a specific implementation process of the modeling unit 503, refer to step 103.

The forecast unit 504 is configured to perform forecasting by using the second-granularity forecasting model obtained by the modeling unit 503, so as to obtain second-granularity forecast data.

When the second-granularity forecasting model is obtained according to both the first-granularity data set and the second-granularity data set, the second-granularity forecast data obtained by the forecast unit 504 may serve as output of the data processing apparatus.

Certainly, when the second-granularity forecasting model is obtained according to only the second-granularity data set, or more precise output needs to be obtained although the second-granularity forecasting model is obtained according to both the first-granularity data set and the second-granularity data set, the data processing apparatus provided in this embodiment of the present invention may further include the following composition units: a smooth parameter acquiring unit 505, and a smooth correction unit 506.

The smooth parameter acquiring unit 505 is configured to acquire a smooth parameter according to the first-granularity data set generated by the data set generation unit 502.

For a specific implementation process of the smooth parameter acquiring unit 505, refer to step 105.

The smooth correction unit 506 is configured to perform, by using the smooth parameter acquired by the smooth parameter acquiring unit 505, smooth correction on the second-granularity forecast data on which smooth correction is to be performed. The second-granularity forecast data on which smooth correction is to be performed may be obtained by the forecast unit 504.

For a specific implementation process of the smooth correction unit 506, refer to step 106.

Second-granularity forecast data obtained by the smooth correction unit 506 after the smooth correction may serve as output of the data processing apparatus. However, when more precise output needs to be obtained, the data processing apparatus provided in this embodiment of the present invention may further include the following composition units: a feedback correction parameter acquiring unit 507 and a feedback correction unit 508.

The feedback correction parameter acquiring unit 507 is configured to acquire a feedback correction parameter according to a third-granularity data set generated by the data set generation unit 502, where a third granularity is coarser than the second granularity.

In a specific implementation process, the feedback correction parameter acquiring unit 507 may be a unit same as the smooth parameter acquiring unit 505, and certainly may be a different unit.

For a specific implementation process of the feedback correction parameter acquiring unit 507, refer to step 107.

The feedback correction unit 508 is configured to perform, by using the feedback correction parameter acquired by the feedback correction parameter acquiring unit 507, feedback correction on second-granularity forecast data on which feedback correction is to be performed. The second-granularity forecast data on which feedback correction is to be performed may be the second-granularity forecast data obtained by the forecast unit 504. In this case, the second-granularity forecast data, of the smooth correction unit 506, on which smooth correction is to be performed may be the second-granularity forecast data obtained by the feedback correction unit 508 after the feedback correction, or may be the second-granularity forecast data obtained by the smooth correction unit 506 after the smooth correction, that is, smooth correction processing is first performed on the second-granularity forecast data obtained by the forecast unit 504, and then feedback correction processing is performed on the second-granularity forecast data obtained after the smooth correction.

For a specific implementation process of the feedback correction unit 508, refer to step 108.

It may be understood that, in an actual application, the data processing apparatus may include only units 501 to 504; in this case, the modeling of the modeling unit 503 may be performed according to both the first-granularity data set and the second-granularity data set. Alternatively, the data processing apparatus may include only units 501 to 506; in this case, a modeling process of the modeling unit 503 is not limited. Alternatively, the data processing apparatus may include only units 501 to 504 and units 507 and 508; in this case, a modeling process of the modeling unit 503 is not limited. Certainly, the data processing apparatus may include all of units 501 to 508.

In this embodiment, when a second-granularity forecasting model is established, refer to both a first-granularity data set and a second-granularity data set, so that forecasting performed by using the second-granularity forecasting model is affected by the first-granularity data set; therefore, second-granularity forecast data obtained by using the second-granularity forecasting model tends to be consistent with first-granularity data, making the second-granularity forecast data more precise. Further, a smooth parameter may be further acquired according to the first-granularity data set, and the smooth parameter may be further used to perform smooth correction on the second-granularity forecast data, so that second-granularity forecast data obtained after the smooth correction further tends to be consistent with the first-granularity data. Further, a feedback correction parameter may be further acquired according to a third-granularity data set, and the feedback correction parameter may be further used to perform feedback correction on the second-granularity forecast data, so that second-granularity forecast data obtained after the feedback correction further tends to be consistent with third-granularity data.

Figure 6:
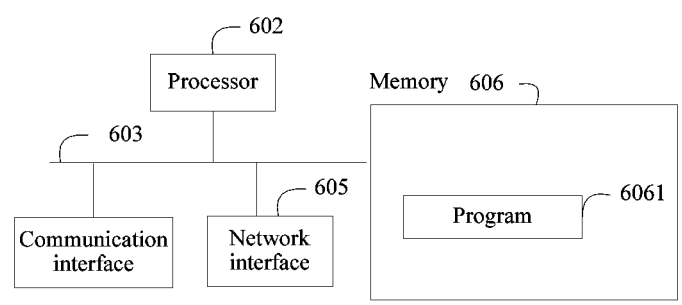
FIG. 6 is a structural diagram of a data processing apparatus according to another embodiment of the present invention.

FIG. 6 describes a structure of a data processing apparatus according to another embodiment of the present invention, including at least one processor 602 (for example, a CPU), at least one network interface 605 or other communications interface, a memory 606, and at least one communications bus 603 configured to implement connection and communication between these apparatuses. The processor 602 is configured to execute an executable module stored in the memory 606, for example, a computer program. The memory 606 may include a high-speed random access memory (RAM: Random Access Memory), or further includes a non-volatile memory (non-volatile memory), for example, at least one magnetic storage disk. The at least one network interface 605 (which may be wired or wireless) implements communication connection between a system gateway and at least one other network element over the Internet, a wide area network, a local area network, a metropolitan area network, or the like.

In some implementation manners, the memory 606 stores a program 6061, where the program 6061 may be executed by the processor 602, and this program may perform steps 101 to 104, or steps 101 to 106, or steps 101 to 104 and steps 107 and 108, or steps 101 to 108.

In this embodiment, when a second-granularity forecasting model is established, refer to both a first-granularity data set and a second-granularity data set, so that forecasting performed by using the second-granularity forecasting model is affected by the first-granularity data set; therefore, second-granularity forecast data obtained by using the second-granularity forecasting model tends to be consistent with first-granularity data, making the second-granularity forecast data more precise. Further, a smooth parameter may be further acquired according to the first-granularity data set, and the smooth parameter may be further used to perform smooth correction on the second-granularity forecast data, so that second-granularity forecast data obtained after the smooth correction further tends to be consistent with the first-granularity data. Further, a feedback correction parameter may be further acquired according to a third-granularity data set, and the feedback correction parameter may be further used to perform feedback correction on the second-granularity forecast data, so that second-granularity forecast data obtained after the feedback correction further tends to be consistent with third-granularity data.

Content such as information exchange and an execution process between the modules in the apparatus and the system is based on a same idea as the method embodiments of the present invention. Therefore, for detailed content, refer to descriptions in the method embodiments of the present invention, and details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

Specific examples are used in this specification to describe the principle and implementation manners of the present invention. The descriptions of the foregoing embodiments are merely intended to help understand the method and idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A method for processing data by a data processing apparatus, the method comprising:
   acquiring historical data, by a network interface of the data processing apparatus, wherein the historical data belongs to a first level and a second level, and data corresponding to the first level comprises data corresponding to the second level;
   generating, by a processor of the data processing apparatus, from the historical data, a first-granularity data set according to a first granularity;
   generating, by the processor, from the historical data, a second-granularity data set according to a second granularity, wherein the first granularity and the second granularity respectively correspond to the first level and the second level;
   performing, by the processor, modeling for a second-granularity forecasting model according to the first-granularity data set and the second-granularity data set;
   performing, by the processor, an performing forecasting by using the second-granularity forecasting model; and
   obtain, by the network interface, second-granularity forecast data.

2. The method according to claim 1, wherein the first level and the second level respectively comprise:
   a first space level and a second space level, a first time level and a second time level, a first organization level and a second organization level, or
   a first quantity level and a second quantity level.

3. The method according to claim 2, wherein the first time level and the second time level refer to two levels that have different time lengths and to which the data belonging to the first level and the data belonging to the second level respectively belong;
   the first space level and the second space level refer to two levels that have different space sizes and to which the data belonging to the first level and the data belonging to the second level respectively belong;
   the first organization level and the second organization level refer to two levels that have different organization level ranks and to which the data belonging to the first level and the data belonging to the second level respectively belong;
   the first quantity level and the second quantity level refer to two levels that have different user quantities and to which the data belonging to the first level and the data belonging to the second level respectively belong,
   wherein in a level comparison relationship, the first level is higher than the second level, that is, the first-granularity data set corresponding to the first level is larger than and comprises the second-granularity data set corresponding to the second level.

4. The method according to claim 3, wherein the performing modeling for a second-granularity forecasting model according to the first-granularity data set and the second-granularity data set comprises:
   acquiring a maximum-likelihood estimation (MLE) model of the second-granularity data set;
   acquiring a penalty coefficient product correction term of an accumulative sum of the first-granularity data set;
   performing correction on the MLE model of the second-granularity data set by using the penalty coefficient product correction term of the accumulative sum of the first-granularity data set; and completing the modeling for the second-granularity forecasting model by using a corrected MLE model of the second-granularity data set.

5. The method according to claim 4, wherein the method further comprises:
acquiring, the network interface of the data processing apparatus, a smooth parameter according to the first-granularity data set; and
performing, by the processor of the data processing apparatus, smooth correction on the second-granularity forecast data by using the smooth parameter.

6. The method according to claim 5, wherein the acquiring the smooth parameter according to the first-granularity data set comprises:
performing modeling for a first-granularity forecasting model according to the first-granularity data set;
acquiring at least two first-granularity data subsets of the first-granularity data set, wherein amounts of first-granularity data respectively comprised in the at least two first-granularity data subsets increase in sequence, and a data subset with a larger amount of data comprises all data comprised in a data subset with a smaller amount of data;
performing forecasting by using the first-granularity forecasting model to obtain at least two pieces of first-granularity forecast data, wherein the at least two pieces of first-granularity forecast data correspond to the first-granularity data subsets one to one;
obtaining at least two substep smooth parameters according to the at least two pieces of first-granularity forecast data, wherein the substep smooth parameters correspond to the at least two pieces of first-granularity forecast data one to one; and
obtaining the smooth parameter according to the at least two substep smooth parameters.

7. The method according to claim 6, wherein the at least two first-granularity data subsets comprise a first-granularity data subset A, and the first-granularity data subset A corresponds to first-granularity forecast data A; and
the obtaining at least two substep smooth parameters according to the at least two pieces of first-granularity forecast data comprises:
aggregating the first-granularity forecast data A into second-granularity data A;
acquiring, from the second-granularity data set, second-granularity data B corresponding to the second-granularity data A; and
obtaining, according to the second-granularity data A and the second-granularity data B, a substep smooth parameter corresponding to the first-granularity forecast data A.

8. The method according to claim 7, wherein the substep smooth parameter corresponding to the first-granularity forecast data A is obtained by means of calculation by using the following formula:

$$\lambda = \frac{S_{realB}}{S_{forecastA}} - 1;$$

wherein
$\lambda$ is the substep smooth parameter corresponding to the first-granularity forecast data A, $S_{realB}$ is the second-granularity data B, and $S_{forecastA}$ is the second-granularity data A.

9. The method according to claim 3, wherein the method further comprises:
generating, from the historical data, a third-granularity data set according to a third granularity, wherein the third granularity is coarser than the second granularity;
acquiring a feedback correction parameter according to the third-granularity data set; and
performing feedback correction on the second-granularity forecast data by using the feedback correction parameter.

10. A data processing method for processing data in by a data processing apparatus, the method comprising:
acquiring historical data, by a network interface of the data processing apparatus, wherein the historical data belongs to a first level and a second level, and data corresponding to the first level comprises data corresponding to the second level;
generating, a processor of the data processing apparatus, from the historical data, a first-granularity data set according to a first granularity, and generating, from the historical data, a second-granularity data set according to a second granularity, wherein the first granularity and the second granularity respectively correspond to the first level and the second level;
performing, by the processor, modeling for a second-granularity forecasting model according to the second-granularity data set;
performing, by the processor, forecasting by using the second-granularity forecasting model to obtain second-granularity forecast data;
acquiring, by the network interface, a smooth parameter according to the first-granularity data set; and
performing, by the processor, smooth correction on the second-granularity forecast data by using the smooth parameter.

11. The method according to claim 10, wherein the first level and the second level respectively comprise:
a first space level and a second space level, a first time level and a second time level, a first organization level and a second organization level, or a first quantity level and a second quantity level.

12. The method according to claim 11, wherein the first time level and the second time level refer to two levels that have different time lengths and to which the data belonging to the first level and the data belonging to the second level respectively belong;
the first space level and the second space level refer to two levels that have different space sizes and to which the data belonging to the first level and the data belonging to the second level respectively belong;
the first organization level and the second organization level refer to two levels that have different organization level ranks and to which the data belonging to the first level and the data belonging to the second level respectively belong;
the first quantity level and the second quantity level refer to two levels that have different user quantities and to which the data belonging to the first level and the data belonging to the second level respectively belong,
wherein in a level comparison relationship, the first level is higher than the second level, that is, the first-granularity data set corresponding to the first level is larger than and comprises the second-granularity data set corresponding to the second level.

13. The data processing method according to claim 12, wherein the method further comprises:

generating, by the processor, from the historical data, a third-granularity data set according to a third granularity, wherein the third granularity is coarser than the second granularity;
acquiring, the network interface, a feedback correction parameter according to the third-granularity data set; and
performing, by the processor, feedback correction on the second-granularity forecast data by using the feedback correction parameter.

14. The data processing method according to claim 13, wherein the modeling for the second-granularity forecasting model is performed by using only the second-granularity data set; or
the modeling for the second-granularity forecasting model is performed by using the first-granularity data set and the second-granularity data set.

15. A data processing method comprising:
acquiring historical data, by a network interface of the data processing apparatus, wherein the historical data belongs to a first level and a second level, and data corresponding to the first level comprises data corresponding to the second level;
generating, a processor of the data processing apparatus, from the historical data, a first-granularity data set according to a first granularity, and generating, from the historical data, a second-granularity data set according to a second granularity, wherein the first granularity and the second granularity respectively correspond to the first level and the second level;
the first level and the second level respectively comprise a first space level and a second space level, a first time level and a second time level, a first organization level and a second organization level, or a first quantity level and a second quantity level;
  a) the first time level and the second time level refer to two levels that have different time lengths and to which the data belonging to the first level and the data belonging to the second level respectively belong;
  b) the first space level and the second space level refer to two levels that have different space sizes and to which the data belonging to the first level and the data belonging to the second level respectively belong;
  c) the first organization level and the second organization level refer to two levels that have different organization level ranks and to which the data belonging to the first level and the data belonging to the second level respectively belong; and
  d) the first quantity level and the second quantity level refer to two levels that have different user quantities and to which the data belonging to the first level and the data belonging to the second level respectively belong,
wherein in a level comparison relationship, the first level is higher than the second level, that is, the first-granularity data set corresponding to the first level is larger than and comprises the second-granularity data set corresponding to the second level;
performing, by the processor, modeling for a first-granularity forecasting model according to the first-granularity data set;
performing, by the processor, forecasting by using the first-granularity forecasting model to obtain first-granularity forecast data;

acquiring, by the network interface, a feedback correction parameter according to the second-granularity data set; and
performing, by the network interface, feedback correction on the first-granularity forecast data by using the feedback correction parameter.

16. A data processing apparatus comprising:
a memory storing program instructions;
a network interface, configured to acquire historical data, wherein the historical data belongs to a first level and a second level, and data corresponding to the first level comprises data corresponding to the second level; and
a processor coupled to the memory and the receiver,
wherein the processor, by executing the program instructions, is configured to:
  generate, from the historical data, a first-granularity data set according to a first granularity, and generate, from the historical data, a second-granularity data set according to a second granularity, wherein the first granularity and the second granularity respectively correspond to the first level and the second level; and the first level and the second level respectively comprise: a first space level and a second space level, a first time level and a second time level, a first organization level and a second organization level, or a first quantity level and a second quantity level;
  perform modeling for a second-granularity forecasting model according to the first-granularity data set and the second-granularity data set; and
  perform forecasting by using the second-granularity forecasting model, so as to obtain second-granularity forecast data.

17. The apparatus according to claim 16, wherein
the first time level and the second time level refer to two levels that have different time lengths and to which the data belonging to the first level and the data belonging to the second level respectively belong;
the first space level and the second space level refer to two levels that have different space sizes and to which the data belonging to the first level and the data belonging to the second level respectively belong;
the first organization level and the second organization level refer to two levels that have different organization level ranks and to which the data belonging to the first level and the data belonging to the second level respectively belong; and
the first quantity level and the second quantity level refer to two levels that have different user quantities and to which the data belonging to the first level and the data belonging to the second level respectively belong,
wherein in a level comparison relationship, the first level is higher than the second level, that is, the first-granularity data set corresponding to the first level is larger than and comprises the second-granularity data set corresponding to the second level.

18. The apparatus according to claim 17, wherein the processor, by executing the program instructions, is configured to:
acquire a maximum-likelihood estimation (MLE) model of the second-granularity data set;
acquire a penalty coefficient product correction term of an accumulative sum of the first-granularity data set;
perform correction on the MLE model of the second-granularity data set by using the penalty coefficient product correction term of the accumulative sum of the first-granularity data set; and complete the modeling for the second-granularity forecasting model by using a corrected MLE model of the second-granularity data set.

19. The apparatus according to claim 17, wherein the processor, by executing the program instructions, is configured to:
   acquire a smooth parameter according to the first-granularity data set generated by the data set generation unit; and
   perform, by using the smooth parameter acquired by the smooth parameter acquiring unit, smooth correction on the second-granularity forecast data obtained by the forecast unit.

20. The apparatus according to claim 19, wherein the processor, by executing the program instructions, is configured to:
   perform modeling for a first-granularity forecasting model according to the first-granularity data set;
   acquire at least two first-granularity data subsets of the first-granularity data set, wherein amounts of first-granularity data respectively comprised in the at least two first-granularity data subsets increase in sequence, and a data subset with a larger amount of data comprises all data comprised in a data subset with a smaller amount of data;
   perform forecasting by using the first-granularity forecasting model to obtain at least two pieces of first-granularity forecast data, wherein the at least two pieces of first-granularity forecast data correspond to the first-granularity data subsets one to one;
   obtain at least two substep smooth parameters according to the at least two pieces of first-granularity forecast data, wherein the substep smooth parameters correspond to the at least two pieces of first-granularity forecast data one to one; and
   obtain the smooth parameter according to the at least two substep smooth parameters.

\* \* \* \* \*